Figure 1:
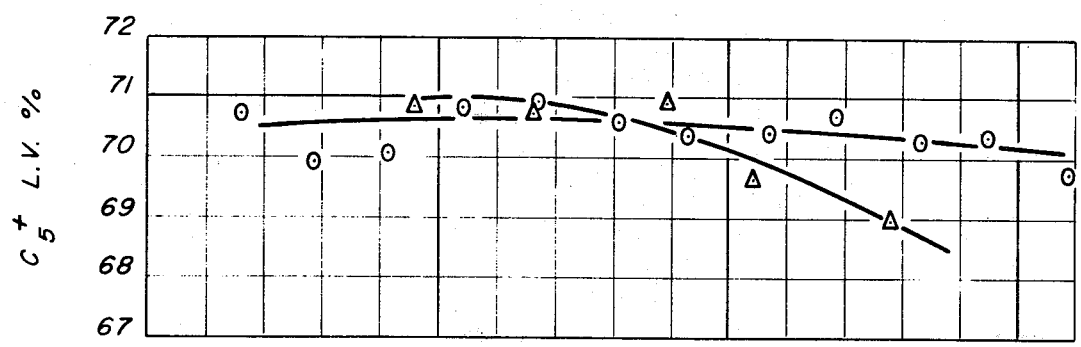

United States Patent [19]

Antos et al.

[11] 4,178,268
[45] Dec. 11, 1979

[54] SELECTIVELY SULFIDED ACIDIC MULTIMETALLIC CATALYTIC COMPOSITE

[75] Inventors: George J. Antos, Arlington Heights; John C. Hayes, Palatine; Roy T. Mitsche, Wauconda, all of Ill.

[73] Assignee: UOP Inc., Des Plaines, Ill.

[21] Appl. No.: 872,288

[22] Filed: Jan. 25, 1978

Related U.S. Application Data

[62] Division of Ser. No. 795,055, May 9, 1977, Pat. No. 4,124,491.

[51] Int. Cl.$^2$ .............................................. B01J 27/04
[52] U.S. Cl. ..................................... 252/439; 252/441; 208/139; 252/466 PT
[58] Field of Search .......... 252/439, 441, 442, 466 PT

[56] References Cited

U.S. PATENT DOCUMENTS

| | | | |
|---|---|---|---|
| 3,415,737 | 12/1968 | Kluksdahl | 252/466 PT X |
| 3,617,520 | 11/1971 | Kluksdahl | 252/439 X |
| 3,852,190 | 12/1974 | Buss et al. | 252/466 PT X |
| 4,012,313 | 3/1977 | Buss et al. | 252/441 X |
| 4,032,475 | 6/1977 | Knapik et al. | 252/441 X |

*Primary Examiner*—Patrick Garvin
*Attorney, Agent, or Firm*—James R. Hoatson, Jr.; Thomas K. McBride; William H. Page, II

[57] ABSTRACT

Hydrocarbons are converted by contacting them at hydrocarbon conversion conditions with a selective sulfided acidic multimetallic catalytic composite comprising a combination of catalytically effective amounts of a platinum group component, a sulfided rhenium component and a halogen component with a porous carrier material formed from Ziegler alumina. The platinum group component, sulfided rhenium component and halogen component are present in the multimetallic catalytic composite in an amount, calculated on an elemental basis, corresponding to about 0.01 to about 2 wt. % platinum group metal, about 0.01 to about 2 wt. % rhenium, about 0.1 to about 3.5 wt. % halogen and sulfur in an amount at least sufficient to provide an atomic ratio of sulfur to rhenium of at least about 0.5:1. These metallic components are, moreover, relatively uniformly dispersed throughout the Ziegler alumina carrier material in carefully controlled oxidation state such that substantially all of the platinum group metal is present therein in the elemental metallic state and a substantial portion of the rhenium present therein is maintained in a sulfided state. A key feature of the hydrocarbon conversion process using the subject catalyst involves the continuous maintenance of the sulfided state of the rhenium component for the duration of the hydrocarbon conversion process.

8 Claims, 3 Drawing Figures

SELECTIVELY SULFIDED ACIDIC MULTIMETALLIC CATALYTIC COMPOSITE

CROSS-REFERENCE TO RELATED APPLICATIONS

This application is a division of our prior, copending application Ser. No. 795,055 filed May 9, 1977, U.S. Pat. No. 4,124,491. All of the teachings of this prior application are specifically incorporated herein by reference.

The subject of the present invention is a novel selectively sulfided acidic multimetallic catalytic composite which has exceptional activity, selectivity and resistance to deactivation when employed in a hydrocarbon conversion process that requires a catalyst having both a hydrogenation-dehydrogenation function and a carbonium ion-forming function. The present invention, more precisely, involves a novel dual-function selectively sulfided acidic multimetallic catalytic composite which, quite surprisingly, enables substantial improvement in hydrocarbon conversion processes that have traditionally used a platinum group metal-containing, dual-function catalyst. According to another aspect, the present invention comprehends the improved processes that are produced by the use of a selectively sulfided acidic catalytic composite comprising a combination of catalytically effective amounts of a platinum group metal component, a sulfided rhenium component, and a halogen component with a porous carrier material formed from a Ziegler alumina; specifically, an improved reforming process which utilizes the subject catalyst to improve activity, selectivity and stability characteristics associated therewith.

Composites having a hydrogenation-dehydrogenation function and a carbonium ion-forming function are widely used today as catalysts in many industries, such as the petroleum and petrochemical industry, to accelerate a wide spectrum of hydrocarbon conversion reactions. Generally, the carbonium ion-forming function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, hydrogenolysis, isomerization, dehydrogenation, hydrogenation, desulfurization, cyclization, polymerization, alkylation, cracking, hydroisomerization, dealkylation, transalkylation, etc. In many cases, the commercial applications of these catalysts are in processes where more than one of the reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking and hydrogenolysis of naphthenes and paraffins, and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is a hydroisomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as hydrogen; (2) selectivity refers to the amount of desired product or products obtained relative to the amount of reactants charged or converted; (3) stability refers to the rate of change with time of the activity and selectivity parameters—obviously, the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield, relative to the amount of the charge that is obtained at the particular activity or severity level; and stability is typically equated to the rate of change with time of activity, as measured by octane number of $C_5+$ product, and of selectivity as measured by $C_5+$ yield. Actually, the last statement is not strictly correct because generally a continuous reforming process is run to produce a constant octane $C_5+$ product with severity level being continuously adjusted to attain this result; and furthermore, the severity level is for this process usually varied by adjusting the conversion temperature in the reaction so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which is a hydrogen-deficient polymeric substance having properties akin to both polynuclear aromatics and graphite. This material coats the surface of the catalyst and thus reduces its activity by shielding its active sites from the reactants. In other words, the performance of this dual-function catalyst is sensitive to the presence of carbonaceous deposits or coke on the surface of the catalyst. Accordingly, the major problem facing workers in this area of the art is the development of more active and/or selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability characteristics. In particular, for a reforming process, the problem is typically expressed in terms of shifting and stabilizing the $C_5+$ yield-octane relationship at the lowest possible severity level—$C_5+$ yield being representative of selectivity and octane being proportional to activity.

We have now found a dual-function selectively sulfided acidic multimetallic catalytic composite which possesses improved activity, selectivity and stability characteristics relative to similar catalysts of the prior art when it is employed in a process for the conversion of hydrocarbons of the type which have heretofore utilized dual-function, platinum group metal-containing acidic catalytic composites such as processes for isomerization, hydroisomerization, dehydrogenation, desulfurization, denitrogenization, hydrogenation, alkylation, dealkylation, disproportionation, polymerization, hydrodealkylation, transalkylation, cyclization, dehydrocyclization, cracking, hydrocracking, halogenation, reforming, and the like processes. In particular, we have now established that a selectively sulfided acidic catalyst comprising a combination of catalytically effective amounts of a platinum group metal component, a sulfided rhenium component and a halogen component with a porous carrier material formed from Ziegler alumina, can enable the performance of hydrocarbon conversion processes utilizing dual-function catalysts to be substantially improved if the metallic components are relatively uniformly dispersed throughout the Ziegler alumina carrier material and if their oxidation states are adjusted so that substantially all of the platinum group component is present in the elemental metallic state and a substantial portion of the rhenium component is maintained in a sulfided state throughout the duration of the hydrocarbon conversion process. A specific example of our discovery involves our determination that a selectively sulfided acidic catalytic composite, comprising a combination of catalytically effective amounts of a platinum component, a sulfided rhenium component and a chloride component with a Ziegler alumina carrier material, can be utilized to substantially improve the performance of a hydrocarbon reforming process which operates on a low-octane gasoline fraction to produce a high-octane reformate if the metallic components are relatively uniformly dispersed throughout the Ziegler alumina carrier material, if the catalyst is selectively sulfided so that substantially all of the sulfide is associated with the rhenium component and if the sulfided state of the rhenium component is continuously maintained for the duration of the reforming process. In the case of a reforming process, major advantages associated with the use of the present invention involve: (1) the acquisition of the capability to operate in a stable manner (particularly in regard to $C_5+$ yield) in a high severity operation; for example, a low or moderate pressure reforming process designed to produce a $C_5+$ reformate having an octane of about 100 F-1 clear; (2) substantially increased activity for octane upgrading reaction along with increased $C_5+$ yield stability relative to the performance of prior art bimetallic platinum-rhenium on conventional alumina catalyst systems as exemplified in the teachings of Kluksdahl in his U.S. Pat. No. 3,415,737; and (3) increased tolerance for sulfur contaminants in the charge stock coupled with vastly increased selectivity for $C_5+$ yields and hydrogen production relative to the performance of the unsulfided platinum-rhenium on Ziegler alumina catalyst system as described in the prior patents of Buss et al, U.S. Pat. Nos. 3,852,190 and 4,012,313. In sum, the present invention involves the finding that the addition of a combination of a Ziegler alumina carrier material and a sulfided rhenium component to a dual-function acidic hydrocarbon conversion catalyst containing a platinum group component can enable the performance characteristics of the resulting catalyst to be sharply and materially improved if the hereinafter specified limitations on amounts of ingredients, selective sulfiding of the rhenium component, oxidation state of the platinum group component and distribution of the metallic component in the Ziegler alumina carrier material are met.

It is, accordingly, one subject of the present invention to provide a selectively sulfided acidic multimetallic hydrocarbon conversion catalyst having superior performance characteristics when utilized in a hydrocarbon conversion process. A second object is to provide a selectively sulfided acidic multimetallic catalyst having dual-function hydrocarbon conversion performance characteristics that are relatively insensitive to the deposition of hydrocarbonaceous material thereon and to the presence of sulfur contaminants in the reaction environment. A third object is to provide preferred methods of preparation of this selectively sulfided acidic multimetallic catalytic composite which ensures the achievement and maintenance of its properties. Another object is to provide an improved platinum-rhenium catalyst system having superior activity, selectivity, and stability characteristics relative to the platinum-rhenium catalyst systems of the prior art. Yet another object is to provide a selectively sulfided dual-function hydrocarbon conversion catalyst which utilizes a combination of a Ziegler alumina carrier material and a sulfided rhenium component to beneficially interact with and promote an acidic catalyst containing a platinum group component.

Without the intention of being limited by the following explanation, we believe Ziegler alumina gives a unique effect when it is properly used as a support for platinum and rhenium in a hydrocarbon conversion catalyst. Our findings indicate that this type of catalyst appears to be significantly more active for hydrocarbon conversion reaction relative to a similar catalyst prepared on a conventional alumina support if the Ziegler alumina based catalyst is prepared in the manner taught herein. This increased activity is attributed to a greater interaction of the metal moieties with the carrier material and consequent better dispersion of these metal moieties throughout the support. The greater interaction is thought to be caused by the presence of greater numbers of ion exchange sites on the Ziegler alumina relative to a conventional alumina support and/or by the formation of stronger bonds between the metal moieties and the ion exchange sites on Ziegler alumina relative to conventional alumina supports. Evidence for this unique effect with our catalyst system is essentially twofold: (1) a Ziegler alumina based platinum-rhenium catalyst exhibits greater resistance to sintering at high temperatures; and (2) the hydrogenolysis activity of this catalyst system is greatly increased relative to the same catalyst system prepared on a conventional alumina support. It is, of course, to be observed that the use of Ziegler alumina in a platinum-rhenium catalyst system is taught by the prior art (specifically in U.S. Pat. Nos. 3,852,190 and 4,012,313) but these prior art workers fail to observe increased activity for this catalyst system and merely noted a stability advantage for some, perhaps because of their inability to achieve proper dispersion of the metal moieties on the catalyst support or because of the fact that their work was limited to an unsulfided catalyst system. Regardless of the reason, we have now ascertained that sulfur also gives a unique effect on this catalyst system. The leading statement of the prior art on the use of sulfur in connection with a platinum-rhenium on conventional alumina catalyst systems is perhaps best summarized by reference to the teachings of Kluksdahl contained in his U.S. Pat. No. 3,415,737 where he teaches away from the use of sulfur in this type of catalyst system except for the very limited purpose of preventing a run-away during start-up. Kluksdahl further points out that any sulfur used during start-up with a conventional platinum-rhenium system is stripped from the catalyst during the initial period of reforming and that sulfur can only be maintained on this type of catalyst system by continuous sulfur addition. Kluksdahl in this patent goes on to warn about the many adverse consequences of the continuous presence of sulfur for this type of catalyst system and explains that his invention involves the maintenance of the platinum and rhenium moieties in his catalyst in the metallic state during the course of the hydrocarbon conversion process. In sharp contrast to the teachings of Kluksdahl on the adverse effect of sulfur on a platinum-rhenium on conventional alumina catalyst system, we have now found that the continuous maintenance of sulfur on a Ziegler-alumina based platinum-rhenium catalyst system is highly beneficial if the sulfur is applied in the proper amount and if the sulfur is distributed on the metal moieties in the hereinafter specified manner. For the Ziegler-alumina based catalyst system of the present invention, our findings are that the presence of sulfur acts to increase average $C_5+$ yield and $C_5+$ yield-stability and to stabilize the overall catalyst system at a markedly increased activity level relative to the conventional platinum-rhenium catalyst system taught by Kluksdahl. Additional advantages associated with the sulfided system of the present invention are diminished undesired demethylation activity and other hydrogenolysis reactions during the course of the hydrocarbon conversion process, increased tolerance to sulfur contaminants in the hydrocarbon charge stock and markedly increased overall stability of the process operation. These advantages are manifested particularly in the areas of $C_5+$ yield and hydrogen purity for a catalytic reforming operation with the present catalyst in comparison to the results with unsulfided platinum-rhenium on Ziegler alumina system.

Against this background, the present invention is, in one embodiment, a selectively sulfided acidic hydrocarbon conversion catalytic composite comprising a porous carrier material formed from Ziegler alumina containing, on an elemental basis, about 0.01 to about 2 wt. % platinum group metal, about 0.01 to about 2 wt. % rhenium and about 0.1 to about 3.5 wt. % halogen; wherein the platinum group metal and rhenium are uniformly dispersed throughout the porous alumina carrier material; wherein substantially all of the platinum group metal is present in the elemental metallic state; wherein the composite contains sulfur in the form of sulfide in amounts at least sufficient to provide an atomic ratio of sulfur to rhenium of about 0.5:1 so that a substantial portion of the rhenium is maintained in a sulfided state and wherein the sulfided state of the rhenium component is continuously maintained for the duration of the hydrocarbon conversion process in which the catalyst is utilized.

A second embodiment relates to a selectively sulfided acidic catalytic composite comprising a porous carrier material formed from Ziegler alumina containing, on an elemental basis, about 0.05 to about 1 wt. % platinum group metal, about 0.05 to about 1 wt. % rhenium and about 0.5 to about 1.5 wt. % halogen in the form of combined chloride; wherein the platinum group metal and rhenium are uniformly dispersed throughout the porous alumina carrier material; wherein substantially all of the platinum group metal is present in the corresponding elemental metallic state; and wherein the composite contains sulfur in the form of sulfide in an amount at least sufficient to provide an atomic ratio of sulfur to rhenium of about 0.5:1 so that a substantial portion of rhenium is maintained in a sulfided state.

Another embodiment involves a process for the conversion of a hydrocarbon which comprises contacting the hydrocarbon and hydrogen with the selectively sulfided acidic catalytic composite defined in the first or second embodiments at hydrocarbon conversion conditions.

A highly preferred embodiment comprehends a process for reforming a gasoline fraction which comprises contacting the gasoline fraction and hydrogen with the selectively sulfided acidic catalytic composite described above in the first or second embodiment at reforming conditions selected to produce a high octane reformate.

An especially preferred embodiment is a process for the production of aromatic hydrocarbons which comprises contacting a hydrocarbon fraction rich in aromatic precursors and hydrogen with the selectively sulfided acidic catalytic composite described in the first or second embodiments at aromatic production conditions selected to produce an effluent stream rich in aromatic hydrocarbons.

Other objects and embodiments of the present invention relate to additional details regarding preferred catalytic ingredients, preferred amounts of ingredients, suitable methods of composite preparation, operating conditions for use in the hydrocarbon conversion processes, and the like particulars, which are hereinafter given in the following detailed discussion of each of these facets of the present invention.

The selectively sulfided acidic multimetallic catalyst of the present invention comprises a porous carrier material formed from Ziegler alumina having combined therewith catalytically effective amounts of a platinum group component, a sulfided rhenium component and a halogen component.

Considering first the unique crystalline alumina powder from which the carrier material used in the present invention is made, it has been characterized in U.S. Pat. Nos. 3,852,190 and 4,012,313 as a byproduct from a Ziegler higher alcohol synthesis reaction as described in Ziegler's U.S. Pat. No. 2,892,858. For purposes of simplification, the name "Ziegler alumina" is used herein to identify this material. It is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina. It is commercially available in three forms: (1) Catapal SB—a spray dried powder having a typical surface area of 250 m²/g; (2) Catapal NG—a rotary kiln dried alumina having a typical surface area of 180 m²/g; and (3) Dispal M—a finely divided dispersable product having a typical surface area of about 185 m²/g. For purposes of the present invention, the preferred starting material is the spray dried powder, Catapal SB. This alpha-alumina monohydrate powder may be formed into a suitable catalyst material according to any of the techniques known to those skilled in the catalyst carrier material forming art. Spherical carrier material particles can be formed, for example, from this Ziegler alumina by: (1) converting the alpha-alumina monohydrate powder into an alumina sol by reaction with a suitable peptizing acid and water and thereafter dropping a mixture of the resulting sol and a gelling agent into an oil bath to form spherical particles of an alumina gel which are easily converted to a gamma-alumina carrier material by known methods; (2) forming an extrudate from the powder by established methods and thereafter rolling the extrudate particles on a spinning disc until spherical particles are formed which can then be dried and calcined to form the desired particles of spherical carrier material; and (3) wetting the powder with a suitable peptizing agent and thereafter rolling particles of the powder into spherical masses of the desired size in much the same way that children have been known to make parts of snowmen by rolling snowballs down hills covered with wet snow. This alumina powder can also be formed in any other desired shape or type of carrier material known to those skilled in the art such as rods, pills, pellets, tablets, granules, extrudates and the like forms by methods well known to the practitoners of the catalyst carrier material forming art. The preferred type of carrier material for the present invention is a cylindrical extrudate having a diameter of about 1/32" to about ⅛" (especially about 1/16") and a length to diameter (L/D) ratio of about 1:1 to about 5:1, with a L/D ratio of about 2:1 being especially preferred. The especially preferred extrudate form of the carrier material is preferably prepared by mixing the alumina powder with water and a suitable peptizing agent such as nitric acid, acetic acid, aluminum nitrate and the like material until an extrudable dough is formed. The amount of water added to form the dough is typically sufficient to give a loss on ignition (LOI) at 500° C. of about 45 to 65 wt. %, with a value of about 55 wt. % being especially preferred. On the other hand, the acid addition rate is generally sufficient to provide about 2 to 7 wt. % of the volatile free alumina powder used in the mix, with a vlue of about 3 to 4% being especially preferred. The resulting dough is then extruded through a suitably sized die to form extrudate particles. These particles are then dried at a temperature of about 500° to 800° F. for a period of about 0.1 to about 5 hours and thereafter calcined at a temperature of about 900° F. to about 1500° F. for a period of about 0.5 to about 5 hours to form the preferred extrudate particles of the Ziegler alumina carrier material. In addition, in some embodiments of the present invention the Ziegler alumina carrier material may contain minor proportions of other well known refractory inorganic oxides such as silica, titanium dioxide, zirconium dioxide, chromium oxide, beryllium oxide, vanadium oxide, cesium oxide, hafnium oxide, zinc oxide, iron oxide, cobalt oxide, magnesia, boria, thoria, and the like materials which can be blended into the extrudable dough prior to the extrusion of same. In the same manner crystalline zeolitic aluminosilicates such as naturally occurring or synthetically prepared mordenite and/or faujasite, either in the hydrogen form or in a form which has been treated with a multivalent cation, such as a rare earth, can be incorporated into this carrier material by blending finely divided particles of same into the extrudable dough prior to extrusion of same. As is shown in the examples, the preferred carrier material is substantially pure Ziegler alumina having an apparent bulk density (ABD) of about 0.6 to 1 g/cc (especially an ABD of about 0.7 to about 0.85 g/cc), a surface area of about 150 to about 280 m²/g (preferably about 185 to about 235 m²/g), and a pore volume of about 0.3 to about 0.8 cc/g.

A first essential ingredient of the subject catalyst is the platinum group component. That is, it is intended to cover the use of platinum, iridium, osmium, ruthenium, rhodium, palladium, or mixtures thereof, as a first component of the present composite. It is an essential feature of the present invention that substantially all of this platinum group component exists within the final catalytic composite in the elemental metallic state. Generally, the amount of this component present in the final catalytic composite is small compared to the quantities of the other components combined therewith. In fact, the platinum group component generally will comprise about 0.01 to about 2 wt. % of the final catalytic composite, calculated on an elemental basis. Excellent results are obtained when the catalyst contains about 0.05 to about 1 wt. % of platinum, iridium, rhodium, or palladium metal. Particularly preferred mixtures of these metals are platinum and iridium, and platinum and rhodium.

This platinum group component may be incorporated in the catalytic composite in any suitable manner known to result in a relatively uniform distribution of this component in the carrier material such as coprecipitation or cogelation, coextrusion, ion exchange or impregnation. The preferred method of preparing the catalyst involves the utilization of a soluble, decomposable compound of platinum group metal to impregnate the Ziegler alumina carrier material in a relatively uniform manner. For example, this component may be added to the support by commingling the latter with an aqueous solution of chloroplatinic or chloroiridic or chloropalladic acid. Other water-soluble compounds or complexes of platinum group metals may be employed in impregnation solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic, or chloropalladic acid or rhodium trichloride hydrate, is preferred since it facilitates the incorporation of both the platinum group components and at least a minor quantity of the halogen component in a single step. Hydrogen chloride, nitric acid, or the like acid is also generally added to the impregnation solution in order to further facilitate the incorporation of the halogen component and the uniform distribution of the metallic components throughout the carrier material. In addition, it is generally preferred to impregnate the Ziegler alumina carrier material after it has been calcined in order to minimize the risk of washing away the valuable platinum or palladium compounds; however, in some cases, it may be advantageous to impregnate the Ziegler alumina carrier material when it is in a gelled, plastic dough or dried state.

A second essential ingredient of the acidic multimetallic catalytic composite of the present invention is a sulfided rhenium component. Although this component may be initially incorporated into the subject composite in many different decomposable forms which are hereinafter stated, our basic finding is that a highly beneficial and catalytically active state for this component in a process for hydrocarbon conversion with the instant Ziegler alumina carrier material is the sulfided state. Consequently, it is a key feature of our invention that a substantial portion of the rhenium component exist in the final catalytic composite in a sulfided state. More specifically, sufficient sulfur in the form of sulfide is incorporated in the catalytic composite according to the procedure hereinafter given to result in an atomic ratio of sulfur to rhenium of at least about 0.5:1 and preferably about 0.5:1 to about 1.5:1 or more. The subsequently described oxidation, reduction and selective sulfiding steps which are performed in the preparation of the instant catalytic composite are specifically designed to insure that this sulfided rhenium state for this component is achieved. Best results are obtained when the composite, prior to the selective sulfiding of same, contains all of the rhenium component in the elemental metallic state, thereby facilitating the rapid and complete conversion of same to the desired sulfided rhenium form in the subsequently described sulfiding step. All available evidence indicates that the preferred preparation procedure specifically described in Example I results in a catalyst having a substantial portion of the rhenium contained therein in the sulfided state. The sulfided rhenium component may be utilized in the subject composite in any amount which is catalytically effective with the preferred amount being about 0.01 to about 2 wt. % thereof, calculated on an elemental basis. Typically, best results are obtained with about 0.05 to about 1 wt. % rhenium. It is additionally preferred to select the specific amount of rhenium from within this broad weight range as a function of the amount of the platinum group component on an atomic basis so that the composite possesses an atomic ratio of rhenium to platinum group metal of about 0.05:1 to about 10:1 and especially about 0.2:1 to about 5:1.

This rhenium component may be incorporated into the catalytic composite in any suitable manner known to those skilled in the catalyst formulation art which results in a relatively uniform dispersion of the rhenium throughout the carrier material such as by coprecipitation, ion exchange, coextrusion, cogelation or impregnation. In addition, it may be added at any stage of the preparation of the composite, either during preparation of the Ziegler alumina carrier material or thereafter and the precise method of incorporation used is not deemed to be critical. However, best results are obtained when the rhenium component is relatively uniformly distributed throughout the Ziegler alumina carrier material in a relatively small particle size and the preferred procedures are the ones known to result in a composite having this relatively uniform distribution. One acceptable procedure for incorporating this rhenium component into the composite involves adding the rhenium component to the extrudable Ziegler alumina dough prior to the extrusion of same into the preferred extrudate material. This procedure usually comprehends the addition of a soluble, decomposable compound of rhenium such as perrhenic acid or a salt thereof to the mixture of Ziegler alumina, water and peptizing agent either before or after it has been worked into an extrudable dough. The resulting mixture of the rhenium component and the Ziegler alumina dough is then finished into particles of extrudate by conventional extrusion, drying and calcination steps as explained hereinbefore. An especially preferred way of incorporating this component into the subject composite is an impregnation step wherein the porous Ziegler alumina carrier material is impregnated with a suitable rhenium-containing solution either before, during or after the carrier material is calcined. Preferred impregnation solutions are aqueous solutions of water soluble decomposable rhenium compounds such as ammonium perrhenate, sodium perrhenate, potassium perrhenate, potassium rhenium oxychloride, potassium hexachlororhenate (IV), rhenium chloride, rhenium heptoxide, and the like compounds. Best results are ordinarily obtained when the impregnation solution is an aqueous solution of perrhenic acid. This component can be added to the carrier material either prior to or simultaneously with the platinum group component. Best results are usually achieved when this component is added simultaneously with the platinum group component. In fact, excellent results are obtained with a one-step impregnation procedure using an aqueous acidic solution containing chloroplatinic acid, perrhenic acid and hydrochloric acid to impregnate a calcined extrudate material which has been formed from the Ziegler alumina in the manner previously described.

It is essential to incorporate a halogen component into the selectively sulfided acidic multimetallic catalytic composite of the present invention. Although the precise form of the chemistry of the association of the halogen component with the carrier material is not entirely known, it is customary in the art to refer to the halogen component as being combined with the carrier material, or with the other ingredients of the catalyst in the form of the halide (e.g. as the chloride). This combined halogen may be either fluorine, chlorine, iodine, bromine, or mixtures thereof. Of these, fluorine, and particularly chlorine, are preferred for the purposes of the present invention. The halogen may be added to the Ziegler alumina carrier material in any suitable manner, either during preparation of the support or before or after the addition of the other components. For example, the halogen may be added, at any stage of the preparation of the carrier material or to the calcined carrier material, as an aqueous solution of a suitable, decomposable halogen-containing compound such as hydrogen fluoride, hydrogen chloride, hydrogen bromide, ammonium chloride, etc. The halogen component or a portion thereof, may be combined with the carrier material during the impregnation of the latter with the platinum group as rhenium components; for example, through the utilization of a mixture of chloroplatinic acid and hydrogen chloride. In other situations, the Ziegler alumina powder may be impregnated with halogen prior to work-up of same into the carrier material or a hydrogen halide acid such as hydrochloric acid may be used as the peptizing agent in the extrusion procedure previously described. For reforming, the halogen will be typically combined with the carrier material in an amount sufficient to result in a final composite that contains about 0.1 to about 3.5%, and preferably about 0.5 to about 1.5%, by weight of halogen, calculated on an elemental basis. In isomerization or hydrocracking embodiments, it is generally preferred to utilize relatively larger amounts of halogen in the catalyst—typically, ranging up to about 10 wt. % halogen calculated on an elemental basis, and more preferably, about 1 to about 5 wt. %. It is to be understood that the specified level of halogen component in the instant catalyst can be achieved or maintained during use in the conversion of hydrocarbons by continuously or periodically adding to the reaction zone a decomposable halogen-containing compound such as an organic chloride (e.g. ethylene dichloride, carbon tetrachloride, t-butyl chloride) in an amount of about 1 to 100 wt. ppm. of the hydrocarbon feed, and preferably about 1 to 10 wt. ppm.

In embodiments of the present invention wherein the instant selectively sulfided multimetallic catalytic composite is used for the dehydrogenation of dehydrogenatable hydrocarbons or for the hydrogenation of hydrogenatable hydrocarbons, it is ordinarily a preferred practice to include an alkali or alkaline earth metal component in the composite in an amount sufficient to make the resulting catalytic composite nonacidic and to minimize or eliminate the halogen component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 0.1 to about 5 wt. % of the composite, calculated on an elemental basis. This optional alkali or alkaline earth metal component can be incorporated in the composite in any of the known ways, with impregnation from an aqueous solution of a suitable water-soluble, decomposable compound being preferred.

An optional ingredient for the selectively sulfided multimetallic catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith—for example, an embodiment wherein hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride, and the like compounds, with the aluminum halides and particularly aluminum chloride ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. % of the carrier material generally being preferred.

Regardless of the details of how the components of the catalyst are combined with the Ziegler alumina carrier material, the final catalyst generally will be dried at a temperature of about 200° F. to about 600° F. for a period of typically about 1 to about 24 hours or more, and finally calcined or oxidized at a temperature of about 700° F. to about 1100° F. in an air or oxygen atmosphere for a period of about 0.5 to about 10 or more hours in order to convert substantially all of the metallic components to the corresponding oxide form. Because a halogen component is utilized in the catalyst, best results are generally obtained when the halogen content of the catalyst is adjusted during the oxidation step by including a halogen or a halogen-containing compound such as HCl or an HCl-producing substance in the air or oxygen atmosphere utilized. In particular, when the halogen component of the catalyst is chlorine, it is preferred to use a mole ratio of water to HCl of about 5:1 to about 100:1 during at least a portion of the oxidation step in order to adjust the final chlorine content of the catalyst to a range of about 0.1 to about 3.5 wt. %. Preferably, the duration of this halogenation step is about 1 to 5 hours.

The resulting oxidized catalytic composite is preferably subjected to a substantially water-free reduction step prior to the selective sulfiding step hereinafter described. This reduction step is designed to reduce substantially all of the platinum group component and the rhenium component to the corresponding elemental metallic state and to insure a relatively uniform and finely divided dispersion of the metallic component throughout the Ziegler alumina carrier material. Preferably substantially pure and dry hydrogen (i.e. less than 20 vol. ppm. water) is used as the reducing agent in this step. The reducing agent is contacted with the oxidized catalyst at conditions including a reduction temperature of about 600° to about 1200° F. and a period of time of about 0.5 to about 10 or more hours effective to reduce substantially all of the platinum group component and the rhenium component to the elemental metallic state. This prereduction step can be performed in situ as part of a start-up procedure for a hydrocarbon conversion process using the subject catalyst if the proper precautions are taken to predry this plant to a substantially water-free state and if a substantially water-free hydrogen-containing reduction gas is employed.

A key feature of the present invention involves a selective sulfiding procedure whereby substantially all of the rhenium component contained in the instant catalyst is converted to a sulfided state while substantially all of the platinum group component is maintained in the elemental metallic state. This selective sulfiding step is preferably performed on the catalytic composite resulting from the reduction step. In some cases, it may be possible to perform this sulfiding step on the oxidized catalytic composite directly with simultaneous or subsequent selective reduction of the platinum group component; however, such a sequence of steps is definitely not preferred. This selective sulfiding step can be performed in a number of different ways depending upon the particular set of circumstances faced by the catalyst manufacturer or user. In one mode, it can be performed prior to use of the instant catalyst in the conversion of hydrocarbons by selectively sulfiding the reduced catalyst obtained from the reduction step. In another mode, it can be performed during start-up of the process by adding a sulfiding reagent to the reactor containing the reduced catalyst. And in still another mode of operation, it can be performed at any time after the process using the catalyst hereinbefore described is started-up and lined-out at hydrocarbon conversion conditions. In all cases, this selective sulfiding procedure preferably involves the following common elements: (1) a suitable sulfur-containing decomposable sulfiding reagent which does not contain oxygen and which is capable of converting a metal to a metallic sulfide when contacted with same under sulfiding conditions; (2) sulfiding conditions including a temperature of about 50° F. to about 1100° F. (preferably about 650° F. to 1050° F.), a contact time of about 0.1 to about 100 hours (preferably about 0.5 to 50 hours), and a pressure sufficient to provide reasonably good contact between the catalyst to be sulfided and the sulfiding reagent; and (3) an amount of sulfur incorporated in the catalyst which is sufficient to convert at least a substantial portion of the catalytically available rhenium component to a sulfided state—generally, this involves an amount which is substantially less than the stoichiometric amount for formation of rhenium sulfide from all the rhenium contained in the catalyst and which is typically sufficient to provide an atomic ratio of sulfur to rhenium of at least 0.5:1 and more preferably about 0.5:1 to about 1.5:1. It is to be noted that a crucial feature of the present sulfiding procedure involves carefully adjusting the amount of sulfur present in the subject catalyst so that substantially all of it is associated with the rhenium component and none with the platinum group component. We have ascertained that this last objective is preferably achieved in one of two ways. First, since rhenium has a stronger affinity for sulfur than a platinum group metal, sulfided rhenium will not decompose to a significant extent under conditions at which a platinum group sulfide will fully decompose; therefore, the desired state can be achieved by adding sulfide in an amount in excess of the amount necessary to form the desired rhenium-sulfur combination and thereafter removing the excess by a suitable platinum group sulfide decomposition step as by subjecting the supersulfided catalyst to a stripping operation with sulfur-free hydrogen or a mixture of sulfur-free hydrogen and hydrocarbons at a temperature of about 700° F. to 1100° F. until no further evolution of hydrogen sulfide is detected. The second way involves recognition that a fingerprint reaction catalyzed by elemental metallic rhenium in a process for converting hydrocarbons with same is hydrogenolysis of hydrocarbons to make methane; therefore, the amount of sulfur to be added can be determined by starting-up a hydrocarbon conversion process with the unsulfided catalyst and monitoring the production of methane (either per se or as manifested in the hydrogen purity of the recycle gas) as the sulfiding reagent is added to the reaction zone in relatively small amounts. The correct amount of sulfur in the catalyst is then achieved just at the point where methane production is no longer responsive to further sulfur addition; that is, when it has dropped to a relatively low line-out value. In any case, the sulfiding reagent used is preferably selected from the following materials: hydrogen sulfide; aliphatic mercaptans such as ethyl mercaptan, propyl mercaptan, t-butyl mercaptan, ethylene bimercaptan; aromatic mercaptans such as thiophenol and derivatives; naphthenic mercaptans; aliphatic sulfides; aliphatic disulfides; aliphatic dithio-acids; aliphatic-thioaldehydes and thioketones; and the like sulfur-containing compounds. The preferred sulfiding reagent is hydrogen sulfide. It is to be understood that once the sulfided rhenium state is achieved in the subject catalyst, it is relatively stable particularly where the rhenium is uniformly dispersed on the carrier material as in the present case; nevertheless, it is within the scope of the present invention to continuously or periodically add a very small amount of sulfur to the reaction zone containing the instant selectively sulfided catalyst in order to maintain the desired sulfided rhenium state—normally, this involves the addition of the sulfiding reagent in an amount sufficient to provide about 0.1 to 20 wt. ppm. of sulfur in the hydrocarbon charge stock and, preferably, about 0.2 to about 10 wt. ppm. In the mode of operation where the sulfiding step is conducted while the hydrocarbon conversion process using the subject catalyst is being started-up or has been operating for a time, the sulfiding reagent can be added to the charge stock, the hydrogen stream charged to the process, both of these, or added independently to the reactor containing the catalyst.

According to the present invention, a hydrocarbon charge stock and hydrogen are contacted with the instant selectively sulfided acidic multimetallic catalyst in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use either a fixed bed system or a dense-phase moving bed system such as is shown in U.S. Pat. No. 3,725,249. It is also contemplated that the contacting step can be performed in the presence of a physical mixture of particles of the catalyst of the present invention and particles of a conventional dual-function catalyst of the prior art. In a fixed bed system, a hydrogenrich gas and the charge stock are preheated by any suitable heating means to the desired reaction temperature and then are passed into a conversion zone containing a fixed bed of the selectively sulfided acidic multimetallic catalyst. It is, of course, understood that the conversion zone may be one or more separate reactors with suitable means therebetween to ensure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the selectively sulfided acidic multimetallic catalyst of the present invention is used in a reforming operation, the reforming system will typically comprise a reforming zone containing one or more fixed beds or dense-phase moving beds of the catalysts. In a multiple bed system, it is, of course, within the scope of the present invention to use the present catalyst in less than all of the beds with a conventional dual-function catalyst being used in the remainder of the beds. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also to present. This preferred class includes straight run gasolines, natural gasolines, synthetic gasolines, partially reformed gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment, the charge stock can be a paraffinic stock rich in $C_4$ to $C_8$ normal paraffins, or a normal butane-rich stock, or an n-hexane-rich stock, or a mixture of xylene isomers, or an olefin-containing stock, etc. In a dehydrogenation embodiment, the charge stock can be any of the known dehydrogenatable hydrocarbons such as an aliphatic compound containing 2 to 30 carbon atoms per molecule, a $C_4$ to $C_{30}$ normal paraffin, a $C_8$ to $C_{12}$ alkylaromatic, a naphthene, and the like. In hydrocracking embodiments, the charge stock will be typically a gas oil, heavy cracked cycle oil, etc. In addition, alkylaromatics, olefins, and naphthenes can be conveniently isomerized by using the catalyst of the present invention. Likewise, pure hydrocarbons or substantially pure hydrocarbons can be converted to more valuable products by using the acidic multimetallic catalyst of the present invention in any of the hydrocarbon conversion processes, known to the art, that use a dual-function catalyst.

In a reforming embodiment, it is generally preferred to utilize the novel selectively sulfided acidic multimetallic catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 20 ppm. and preferably less than 5 ppm. expressed as weight of equivalent water in the charge stock. In general, this can be accomplished by careful control of the water present in the charge stock and in the hydrogen stream. The charge stock can be dried by using any suitable drying means known to the art, such as a conventional solid adsorbent having a high selectivity for water, for instance, sodium or calcium crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. In an especially preferred mode of operation, the charge stock is dried to a level corresponding to less than 5 wt. ppm. of water equivalent. In general, it is preferred to maintain the hydrogen stream entering the hydrocarbon conversion zone at a level of about 10 vol. ppm. of water or less and most preferably about 5 vol. ppm. or less. If the water level in the hydrogen stream is too high, drying of same can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25° F. to 150° F., wherein a hydrogen-rich gas stream is separated from a high octane liquid product stream, commonly called an unstabilized reformate. When the water level in the hydrogen stream is outside the range previously specified, at least a portion of this hydrogen-rich gas stream is withdrawn from the separating zone and passed through an adsorption zone containing an adsorbent selective for water. The resultant substantially water-free hydrogen stream can then be recycled through suitable compressing means back to the reforming zone. The liquid phase from the separating zone is typically withdrawn and commonly treated in a fractionating system in order to adjust the butane concentration, thereby controlling front-end volatility of the resulting reformate.

The operating conditions utilized in the numerous hydrocarbon conversion embodiments of the present invention are in general those customarily used in the art for the particular reaction, or combination of reactions, that is to be effected. For instance, alkylaromatic, olefin, and paraffin isomerization conditions include: a temperature of about 32° F. to about 1000° F. and preferably from about 75° F. to about 600° F., a pressure of atmospheric to about 100 atmospheres, a hydrogen to hydrocarbon mole ratio of about 0.5:1 to about 20:1, and an LHSV (calculated on the basis of equivalent liquid volume of the charge stock contacted with the catalyst per hour divided by the volume of conversion zone containing catalyst and expressed in units of $hr.^{-1}$) of about 0.2 to 10. Dehydrogenation conditions include: a temperature of about 700° F. to about 1250° F., a pressure of about 0.1 to about 10 atmospheres, a liquid hourly space velocity of about 1 to 40, and a hydrogen to hydrocarbon mole ratio of about 1:1 to 20:1. Likewise, typical hydrocracking conditions include: a pressure of about 500 psig. to about 3000 psig., a temperature of about 400° F. to about 900° F., an LHSV of about 0.1 to about 10, and hydrogen circulation rates of about 1000 to 10,000 SCF per barrel of charge.

In the reforming embodiment of the present invention, the pressure utilized is selected from the range of about 0 psig. to about 1000 psig., with the preferred pressure being about 50 psig. to about 600 psig. Particularly good results are obtained at low or moderate pressure; namely, a pressure of about 100 to 450 psig. In fact, it is a singular advantage of the present invention that it allows stable operation at lower pressure than have heretofore been successfully utilized in so-called "continuous" reforming systems (i.e. reforming for periods of about 15 to about 200 or more barrels of charge per pound of catalyst without regeneration) with conventional platinum-rhenium catalyst systems. In other words, the selectively sulfided acidic multimetallic catalyst of the present invention allowed the operation of a continuous reforming system to be conducted at lower pressure (i.e. 100 to about 350 psig.) for about the same or better catalyst cycle life before regeneration as has been heretofore realized with conventional platinum-rhenium catalysts at higher pressure (i.e. 300 to 600 psig.). On the other hand, the extraordinary activity and activity-stability characteristics of the catalyst of the present invention relative to a conventional platinum-rhenium catalyst enables reforming conditions conducted at pressures of 300 to 600 psig. to achieve substantially increased catalyst cycle life before regeneration.

The temperature required for reforming with the instant catalyst is markedly lower than that required for a similar reforming operation using a high quality platinum-rhenium catalyst of the prior art. This significant and desirable feature of the present invention is a consequence of the superior activity of the selectively sulfided acidic multimetallic catalyst of the present invention for the octane-upgrading reactions that are preferably induced in a typical reforming operation. Hence, the present invention requires a temperature in the range of from about 775° F. to about 1100° F. and preferably about 850° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that not only is the initial temperature requirement lower, but also the rate at which the temperature is increased in order to maintain a constant octane product is for the instant catalyst system at least as good as if not better than for an equivalent operation with a high quality platinum-rhenium catalyst system of the prior art; for instance, a catalyst prepared in accordance with the teachings of U.S. Pat. No. 3,415,737. Moreover, for the catalyst of the present invention, the average $C_5+$ yield and the $C_5+$ yield stability are substantially better than for this high quality bimetallic reforming catalyst of the prior art. The superior activity, selectivity and stability characteristics of the instant catalyst can be utilized in a number of highly beneficial ways to enable increased performance of a catalytic reforming process relative to that obtained in a similar operation with a platinum-rhenium catalyst of the prior art, some of these are: (1) Octane number of $C_5+$ product can be increased without sacrificing average $C_5+$ yield and/or catalyst run length. (2) The duration of the process operation (i.e. catalyst run length or cycle life) before regeneration becomes necessary can be increased. (3) $C_5+$ yield can be further increased by lowering average reactor pressure with no change in catalyst run length. (4) Investment costs can be lowered without any sacrifice in cycle life or in $C_5+$ yield by lowering recycle gas requirements thereby saving on capital cost for compressor capacity or by lowering initial catalyst loading requirements thereby saving on cost of catalyst and on capital cost of the reactors. (5) Throughput can be increased significantly at no sacrifice in catalyst cycle life or in $C_5+$ yield if sufficient heater capacity is available.

The reforming embodiment of the present invention also typically utilizes sufficient hydrogen to provide an amount of about 1 to about 20 moles of hydrogen per mole of hydrocarbon entering the reforming zone, with excellent results being obtained when about 2 to about 6 moles of hydrogen are used per mole of hydrocarbon. Likewise, the liquid hourly space velocity (LHSV) used in reforming is selected from the range of about 0.1 to about 10, with a value in the range of about 1 to about 5 being preferred. In fact, it is a feature of the present invention that it allows operations to be conducted at higher LHSV than normally can be stably achieved in a continuous reforming process with a high quality platinum-rhenium reforming catalyst of the prior art. This last feature is of immense economic significance because it allows a continuous reforming process to operate at the same throughput level with less catalyst inventory or at greatly increased throughput level with the same catalyst inventory than that heretofore used with conventional platinum-rhenium reforming catalyst at no sacrifice in catalyst life before regeneration.

The following examples are given to illustrate further the preparation of the selectively sulfided acidic multimetallic catalytic composite of the present invention and the use thereof in the conversion of hydrocarbons. It is understood that the examples are intended to be illustrative rather than restrictive.

EXAMPLE I

A Ziegler alumina carrier material comprising 1/16" spheres was prepared by: thoroughly mixing finely divided alpha-alumina monohydrate powder (commercially available under the name of Catapal SB alumina and having a volatile content of about 26 wt. %) with sufficient water to obtain a dough having a LOI of about 50 to about 55% at 500° C. and sufficient nitric acid to provide about 3 to about 4 wt. % of nitric acid per pound of volatile free alumina powder, working the resulting mixture in a mechanical mixer at conditions sufficient to form an extrudable dough, extruding the resulting dough by forcing same through a 1/16" die and thereafter balling the resulting extrudate in a spinning drum with the formation of 1/16" spherical particles. The resulting spherical extruded particles were thereafter dried at a temperature of about 250° to 650° F. for about 2 hours and then calcined at a temperature of about 1200° F. for a period of about 1½ hours to produce spherical particles of a porous carrier material formed from Ziegler alumina having a surface area of about 205 $m^2/g$, a pore volume of about 0.47 cc/g and an ABD of about 0.8 g/cc.

An aqueous impregnation solution containing chloroplatinic acid, perrhenic acid, and hydrogen chloride was then prepared. The particles of Ziegler alumina where thereafter admixed with the impregnation solution. The amount of metallic reagent contained in this impregnation solution was calculated to result in a final catalytic composite containing, on an elemental basis 0.25 wt. % platinum and 0.25 wt. % rhenium. In order to insure uniform dispersion of the metallic components throughout the carrier material, the amount of hydrochloric acid used in the impregnation solution was about 4 Wt. % of the Ziegler alumina particles. The impregnation step was performed by adding the carrier material particles to the impregnation solution with constant agitation. In addition, the volume of the solution was approximately the same as the bulk volume of the carrier material particles. The impregnation solution was maintained in contact with the carrier material particles for a period of about ½ to about 3 hours at a temperature of about 70° F. Thereafter the temperature of the impregnation mixture was raised to about 225° F. and the excess solution was evaporated in the period of about 1 hour. The resulting dried impregnated particles were then subjected to an oxidation treatment in a dry sulfur-free air stream at a temperature of about 1050° F. and a gas hourly space velocity of about 500 hr.$^{-1}$ for about ½ hour. This oxidation step was designed to convert substantially all of the platinum group and rhenium components to the corresponding oxide forms. The resulting oxidized spheres were subsequently contacted in a halogen treating step with a sulfur-free air stream containing water and hydrochloric acid in a mole ratio of about 30:1 for about 2 hours at 1050° F. and a gas hourly space velocity of 500 hr.$^{-1}$ in order to adjust the halogen content of the catalyst particles to a value of about 1 wt. %. The halogen-treated spheres were thereafter subjected to a second oxidation step with a dry and sulfur-free air stream at about 1050° F. and a gas hourly space velocity of 500 hr.$^{-1}$ for an additional period of about ½ hour.

The oxidized and halogen-treated catalyst particles were then subjected to a dry prereduction treatment, designed to reduce substantially all of the platinum and rhenium components to the corresponding elemental metallic state, by contacting these particles for about 1 hour with a substantially hydrocarbon-free and sulfur-free dry hydrogen stream containing less than 5 vol. ppm. water at a temperature of about 1050° F., a pressure slightly above atmospheric and a flow rate of hydrogen stream through the catalyst particles corresponding to a gas hourly space velocity of about 400 hr.$^{-1}$. At the completion of this prereduction step, the resulting reduced catalyst was contacted with a dry gas stream containing a sulfiding reagent (in this case it was hydrogen sulfide) and hydrogen in a selected sulfiding step designed to convert substantially all of the rhenium component and at least a portion of the platinum component to the corresponding sulfide state. The amount of sulfiding reagent contained in this gas stream was about 1.3 mole % thereof. The sulfiding conditions employed were: a temperature of about 1050° F., atmospheric pressure, a space velocity of about 1800 hr.$^{-1}$ and a treatment time of about 30 minutes. The amount of sulfur in the form of sulfide incorporated into the catalyst composite in this presulfiding step was subsequently measured and determined to be equivalent to 0.1 wt. % sulfur calculated on an elemental basis.

The resulting sulfided catalyst was subsequently subjected to a sulfur-stripping operation with a substantially pure hydrogen stream at conditions selected to decompose platinum sulfide without affecting the sulfided rhenium component. The stripping step occurred as part of the subsequently described accelerated reforming test with this catalyst; it was performed during the start-up of this test prior to feed cut in. The stripping conditions utilized were: a temperature of about 700° F., a pressure that varied between 300 psig. to 500 psig. and a treatment time of about 3 hours. Substantial additional sulfur stripping occurred during the pretest and line-out periods for the subsequently described accelerated reforming test during which a low sulfur feed was utilized. As a result of this sulfur-stripping operation that occurred during the start-up of the instant catalyst, our assessment of the sulfur level on this catalyst is that it falls to a level wherein substantially all of the sulfur contained on the catalyst is bound-up with the rhenium component to yield the sulfided rhenium component referred to hereinbefore. Analysis of a sample of the instant catalyst after it has been subjected to this sulfur-stripping operation and has reached the point where the amount of sulfide contained therein has stabilized indicates that the residual sulfide corresponds to an atomic ratio of sulfur to rhenium of about 0.93:1.

The sulfided acidic multimetallic catalyst prepared for this example is hereinafter referred to as Catalyst A and it contains, on an elemental basis, about 0.25 wt. % platinum, about 0.25 wt. % rhenium, about 1 wt. % chloride, and sulfur as explained above.

EXAMPLE II

In order to compare the selectively sulfided acidic multimetallic catalyst composite of the present invention with a platinum-rhenium on a conventional alumina support catalyst of the prior art in a manner calculated to bring out the beneficial interaction of a combination of Ziegler alumina and selective sulfiding on a platinum-rhenium catalyst system, a comparison test was made between the selectively sulfided acidic multimetallic catalyst prepared in accordance with Example I (i.e. Catalyst A) and a control catalyst which was a bimetallic reforming catalyst of the prior art as exemplified by the teachings of kluksdahl's U.S. Pat. No. 3,415,737. The control catalyst is hereinafter designated Catalyst B and was a conventional combination of a platinum component, a rhenium component, a chloride component and a sulfur component with an oil drop gamma-alumina carrier material, analysis of which indicated that the composite contained, on an elemental basis, 0.38 wt. % platinum, 0.38 wt. % rhenium, 0.9 wt. % chloride, and 0.055 wt. % sulfide. Catalyst B has a surface area of 187 m$^2$/g and an ABD of 0.5 g/cc. In order to properly compare Catalyst A with Catalyst B, an adjustment in the metals level of Catalyst B was made in order to account for the difference in apparent bulk density (ABD) between them when loaded into a reactor on a volume basis; specifically, Catalyst A had an ABD of 0.8 g/cc and a total metal level of 0.5 wt. % and Catalyst B had an ABD of 0.5 g/cc and a total metal level of 0.76 wt. %. Consequently, the resulting test data is plotted herein on the basis of barrels of hydrocarbon charge processed per pound of catalyst used (BPP). This mode of presenting the data effectively eliminates apparent bulk density as a factor in the analysis of same; however, it is to be noted that Catalyst B contained 50% more platinum + rhenium than Catalyst A and would on this basis alone be expected to substantially outperform Catalyst A. More specifically, a pound of Catalyst B contains 50% more metals than a pound of Catalyst A and thus the method of comparison adopted herein on a BPP basis tends to favor Catalyst B. This fact should be kept in mind in evaluating the data presented in the attached figures.

The catalysts were then separately subjected to a high stress accelerated catalytic reforming evaluation test designed to determine in a relatively short period of time their relative activity, selectivity, and stability characteristics in a process for reforming a relatively low-octane gasoline fraction. In all tests, the same charge stock was utilized and its pertinent characteristics are set forth in Table I. It is to be noted that all runs were performed with 0.5 ppm of a sulfiding reagent in the feed (it was tertiary butyl mercaptan).

This accelerated reforming test was specifically designed to determine in a very short period of time whether the catalyst being evaluated has superior characteristics for use in a high severity reforming operation.

TABLE I

| Analysis of Charge Stock | |
|---|---|
| Gravity, API at 60° F. | 59.1 |
| Distillation Profile, °F. | |
| Initial Boiling Point | 210 |
| 5% Boiling Point | 220 |
| 10% Boiling Point | 230 |
| 30% Boiling Point | 244 |
| 50% Boiling Point | 278 |
| 70% Boiling Point | 292 |
| 90% Boiling Point | 316 |
| 95% Boiling Point | 324 |
| End Boiling Point | 356 |
| Chloride, wt. ppm. | 0.2 |
| Nitrogen, wt. ppm. | <0.1 |
| Sulfur, wt. ppm. | 0.1 |
| Water, wt. ppm. | <10 |
| Octane Number, F-1 clear | 35.6 |
| Paraffins, vol. % | 67.4 |
| Naphthenes, vol. % | 23.1 |
| Aromatics, vol. % | 9.5 |

Each run consisted of a series of evaluation periods of 24 hours, each of these periods comprises a 12-hour line-out period followed by a 12-hour test period during which the $C_5+$ product reformate from the plant was collected and analyzed. All test runs were performed at identical conditions which comprises a liquid hourly space velocity (LHSV) of 3.0 hr.$^{-1}$, a pressure of 300 psig., a 5:1 gas to oil ratio, and an inlet reactor temperature which was continuously adjusted throughout the test in order to achieve and maintain a $C_5+$ target octane of 100 F-1 clear.

Both test runs were performed in a pilot plant scale reforming unit comprising a reactor containing a fixed bed of the catalyst undergoing evaluation, a hydrogen separation zone, a debutanizer column, and suitable heating means, pumping means, condensing means, compressing means, and the like conventional equipment. The flow scheme utilized in this plant involves commingling a hydrogen recycle stream with the charge stock and heating the resulting mixture to the desired conversion temperature. The heated mixture is then passed downflow into a reactor containing the catalyst undergoing evaluation as a stationary bed. An effluent stream is then withdrawn from the bottom of the reactor, cooled to about 55° F. and passed to a gas-liquid separation zone wherein a hydrogen-rich gaseous phase separates from a liquid hydrocarbon phase. A portion of the gaseous phase is then continuously passed through a high surface area sodium scrubber and the resulting substantially water-free and sulfur-free hydrogen-containing gas stream is returned to the reactor in order to supply the hydrogen recycle stream. The excess gaseous phase from the separation zone is recovered as the hydrogen-containing product stream (commonly called "excess recycle gas"). The liquid phase from the separation zone is withdrawn therefrom and passed to a debutanizer column wherein light ends (i.e. $C_1$ to $C_4$) are taken overhead as debutanizer gas and $C_5+$ reformate stream recovered as the principal bottom product.

Figure 2:
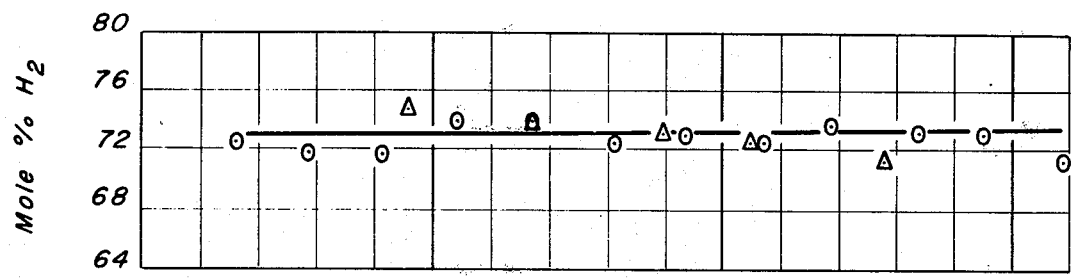
Figure 3:
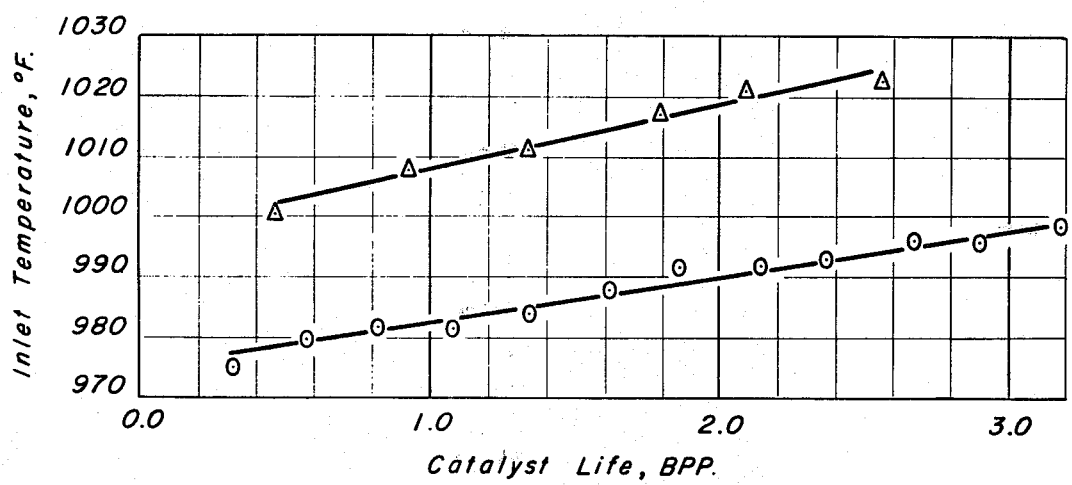

The results of the separate tests performed on the selectively sulfided catalyst of the present invention, Catalyst A, and the control catalyst, Catalyst B, are presented in FIGS. 1, 2 and 3 as a function of time as measured in barrels of charge processed per pound of catalyst contained in the reactor (BPP). It is to be remembered that the charge stock utilized in both cases contained a sulfiding reagent in the form of tertiary butyl mercaptan in an amount corresponding to 0.5 ppm. sulfur. FIG. 1 shows graphically the relationship between $C_5+$ yields expressed as liquid volume percent (LV%) of the charge for each of the catalysts. FIG. 2 on the other hand plots the observed hydrogen purity in mole percent of the recycle gas stream for each of the catalysts. And finally, FIG. 3 tracks inlet reactor temperature necessary for each catalyst to achieve a target octane number of 100 F-1 clear.

Referring now to the results of the comparison test presented in FIGS. 1, 2 and 3, it is immediately evident that the selectively sulfided catalyst of the present invention substantially outperformed the conventional platinum-rhenium control catalyst despite the fact that the catalyst of the present invention has substantially less total metals content. Turning to FIG. 1 it can be ascertained that the $C_5+$ selectivity for Catalyst A was substantially the same as Catalyst B out to about catalyst life of 1.5 barrels of pound at which point Catalyst A tended to exhibit significantly greater yield stability than Catalyst B. The average $C_5+$ yield for the duration of the run for Catalyst A was consequently significantly better than that for Catalyst B. Hydrogen selectivities for these two catalysts are given in FIG. 2 and it is clear from the data that there is no substantial difference between the two catalysts in this area; that is, they both achieved a relatively high stable production of hydrogen. FIG. 3 on the other hand clearly shows a surprising and significant divergence between these two catalysts when it comes to both activity and activity-stability. From the data presented in FIG. 3 it is clear that Catalyst A was consistently about 25° F. more active than the control catalyst. Remembering that a pound of Catalyst B contains approximately 50% more total metals than a pound of Catalyst A, it is immediately apparent that a significant and unexpected improvement in activity characteristics has been achieved by means of the present invention. Applying the well-known rule of thumb that the rate of reaction approximately doubles for every 20° F. change in reaction temperature, it is manifest that Catalyst A is approximately twice as active as Catalyst B. This significant advance in activity characteristics is coupled with an improvement in activity-stability of Catalyst A relative to Catalyst B, which is perhaps best judged by examining the slope of the two curves presented in FIG. 3. In sum, Catalyst A achieved significantly better average $C_5+$ yield and $C_5+$ yield stability, similar hydrogen purity, vastly increased overall activity and significantly improved activity-stability when measured against Catalyst B on a barrels per pound of catalyst basis. It is important to note that these significant achievements of Catalyst A were made in a sulfur-containing environment insofar as 0.5 ppm. of sulfur was added to the charge stock to maintain a selectively sulfided state for both of the catalysts. Consequently, it can also be concluded that Catalyst A showed much greater tolerance to the presence of sulfur as compared to Catalyst B. This result is extremely unexpected in view of the repeated warnings about the adverse effects of the continuous addition of sulfur contained in U.S. Pat. No. 3,415,737.

In final analysis, it is clear from the data presented in FIGS. 1, 2 and 3 that the use of a combination of a sulfided rhenium component and a Ziegler alumina provides an efficient and effective means for significantly promoting and stabilizing an acidic hydrocarbon conversion catalyst containing a platinum group metal in a high severity reforming operation.

It is intended to cover by the following claims all changes and modifications of the above disclosure of the present invention which would be self-evident to a man of ordinary skill in the hydrocarbon conversion art or in the catalyst formulation art.

We claim as our invention:

1. In a selectively sulfided catalytic composite comprising a halogenated porous material containing on an elemental basis about 0.01 to about 2 wt. % platinum group metal, about 0.01 to about 2 wt. % rhenium, and about 0.1 to about 3.5 wt. % halogen; wherein the platinum group metal and rhenium are uniformly dispersed throughout said halogenated porous material; wherein substantially all of said platinum group metal is present in the elemental metallic state; wherein said composite contains sulfur in an amount at least sufficient to provide an atomic ratio of sulfur to rhenium of about 0.5:1 so that a substantial portion of the rhenium is maintained in a sulfided state the improvement, which comprises the presence of Ziegler alumina as said porous material.

2. A selectively sulfided acidic catalytic composite as defined in claim 1 wherein the platinum group metal is platinum.

3. A selectively sulfided acidic catalytic composite as defined in claim 1 wherein the platinum group metal is iridium.

4. A selectively sulfided acidic catalytic composite as defined in claim 1 wherein the platinum group metal is rhodium.

5. A selectively sulfided acidic catalytic composite as defined in claim 1 wherein the halogen is chlorine.

6. A selectively sulfided acidic catalytic composite as defined in claim 1 wherein the catalytic composite is selectively sulfided after substantially all of the platinum group metal and rhenium contained therein are reduced to the elemental metallic state by contacting the reduced catalytic composite with a sulfiding reagent in an amount and under conditions selected to convert a substantial portion of the rhenium to the sulfided state while maintaining substantially all of the platinum group metal in the elemental state.

7. A selectively sulfided acidic catalytic composite as defined in claim 1 wherein the selectively sulfided acidic catalytic composite is prepared by the steps of:
    (a) forming a composite comprising a combination of the specified amounts of platinum group metal, rhenium and halogen with the Ziegler alumina carrier material in which substantially all of the platinum group metal and rhenium are present in the corresponding oxide form;
    (b) subjecting the resulting oxidized catalytic composite to reduction conditions effective to reduce substantially all of the platinum group and rhenium components to the corresponding elemental metallic state;
    (c) sulfiding the resulting reduced composite by contacting same with a sulfiding reagent in an amount and under conditions at least sufficient to convert a substantial portion of the rhenium component and of the platinum group component to the corresponding sulfided state; and thereafter,
    (d) stripping substantially all of the sulfide from the platinum group component resulting from step (c), while maintaining a substantial portion of the rhenium component in a sulfided state.

8. A selectively sulfided acidic catalytic composite as defined in claim 1 wherein the composite contains about 0.05 to about 1 wt. % platinum group metal, about 0.05 to about 1 wt. % rhenium, and about 0.5 to about 1.5 wt. % halogen and wherein sulfur is present therein in an amount sufficient to result in an atomic ratio of sulfur to rhenium of about 0.5:1 to about 1.5:1.

* * * * *